Feb. 10, 1942.   W. B. NEAL   2,272,812
PIPE JOINT
Filed June 7, 1937
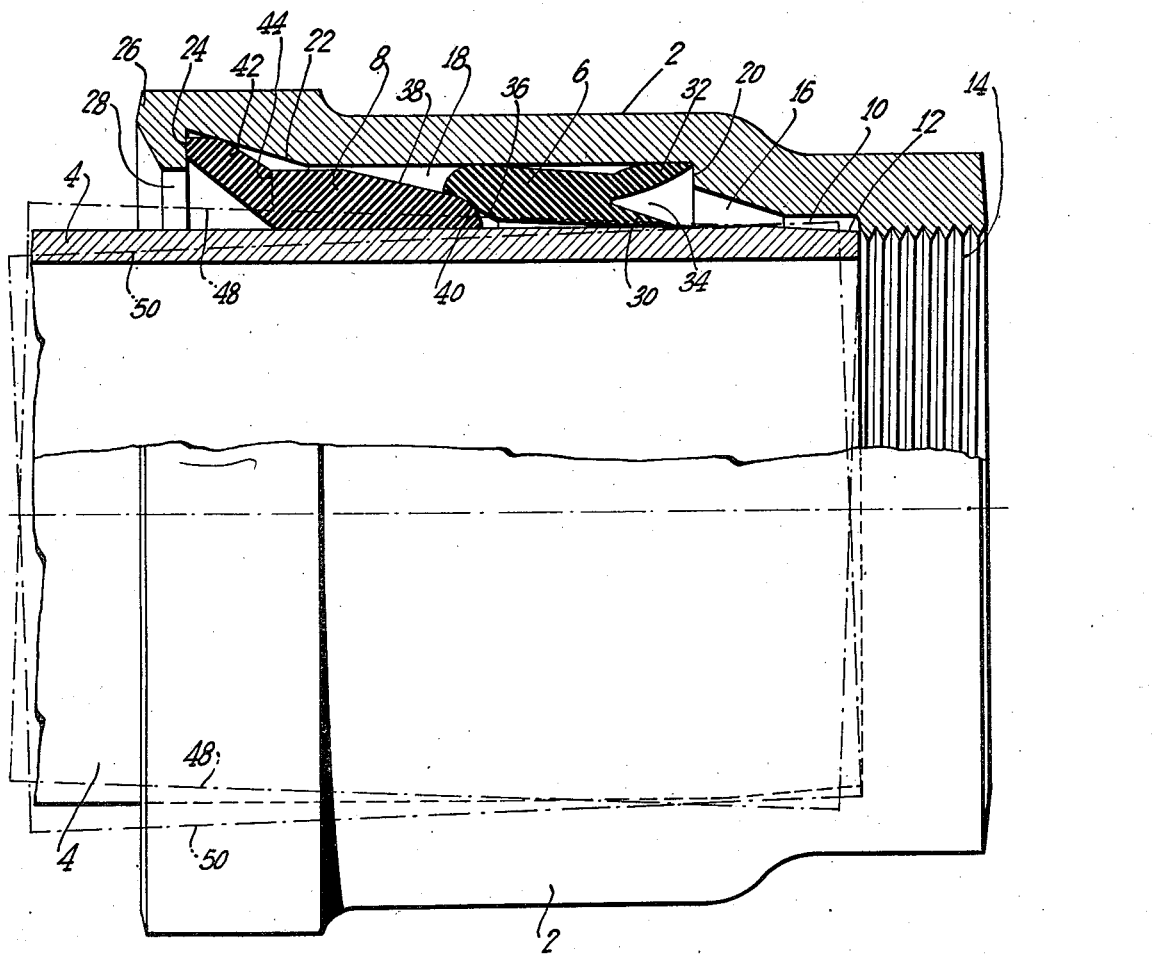
INVENTOR
William B. Neal
BY
Frederic P. Warfield
ATTORNEY Patented Feb. 10, 1942

2,272,812

UNITED STATES PATENT OFFICE 2,272,812

PIPE JOINT

William B. Neal, Oak Park, Ill., assignor, by mesne assignments, to The B. F. Goodrich Company, New York, N. Y., a corporation of New York Application June 7, 1937, Serial No. 146,726

3 Claims. (Cl. 285—163)

The present invention provides an improved joint between adjacent lengths of pipe, which joint is readily assembled, efficient in action, and permits a certain degree of flexing movement, either permanent or casual, to take place between the pipes.

The invention is particularly adapted to pipe joint assemblies for pipes which are buried underground, such as, for example, water mains, sewer pipes or the like, which may be either of metal or of a more fragile composition, such as terra cotta or other kinds of ceramic pipes.

Many attempts have been made to render the joints of such pipe assemblies free from the likelihood of becoming loosened during service, but considerable difficulty has been experienced in producing a pipe joint that will remain tight under service conditions, and continuously form a close seal against escape of liquid around the joints.

It has been proposed to pack the joints of such pipe assemblies with cement or with bituminous material, which have been non-resilient, and upon hardening have been too rigid to cushion satisfactorily relative movement of the pipe sections under soil movement or vibration. The result of such construction often is leakiness around the joints and cracked and even broken pipes.

Moreover, such joints often have been ineffective to resist axial separation of the pipe sections under the "line pull" of soil movements; and the assembling of such joints has required considerable care, skill and time. Considerable equipment for pouring, heating and tamping has been required. When the joints are made in water or silt, it is necessary to take special precautions to exclude such materials during the making of the joint.

Furthermore, in varied pipe lines, there has been difficulty arising through tree roots finding their way in hair-like form into minute crevices of the pipe joint and, on getting access to water from the pipe, have proceeded to grow and, consequently, have burst the joint and pipe.

Attempts have been made, also, to substitute a resilient packing within the joints of the pipe assemblies, but again it has not been practicable to produce uniformly, or with any fair degree of uniformity, a leak-proof joint which will remain leak-proof continuously under conditions of service of the character which have been indicated above; and the difficulties attendant upon the construction and use of a rigid joint have been present to a very substantial extent in even the cushioned joints which have been proposed prior to the present invention.

In order to maintain continuously a seal within the joint for preventing leakage of liquid at the joint, certain conditions must be fulfilled. Thus, the resilient packing must provide a joint wherein the resilient material effectively seals, cushions, and resists pipe separation without, however, stressing the pipe sections excessively, it being understood that terra cotta or other types of ceramic piping are quite fragile and become easily broken. Additionally, the packing must be of a character which will enable the joint to be assembled quickly and conveniently by manual power without special skill and without requiring tools or other equipment for the operation.

A principal object of the invention is to provide an improved pipe joint of the resilient seal or packing type, which joint has a novel and improved configuration of the pipe sections at the joint admitting the efficient use of a resilient packing ring or rings, thereby maintaining a close cooperation between the pipe sections and the packing to produce an effective and continuous seal against leakage of water at the joint irrespective of the strains to which the joint may be subjected.

A further object of the invention is to provide a pipe joint construction of the above-indicated character wherein the packing becomes increasingly closely compressed together in sealing relation with the pipe sections responsively to fluid pressure exerted on the packing while permitting a relative yielding between the sections while the pipe line is in service.

A still further object of the invention is to provide an improved packing which comprises complementary wedge-like sections which are adapted to become increasingly closely sealed under the influence of pressure imparted to the pipe sections and also under the influence of "line pull" exerted on the pipe line, in conjunction with a construction of the pipe sections at the joint which acts to retain the sealing members in operative position and to produce a tight seal therewith regardless of movement of the pipe sections in any direction, thereby producing a positive and continuous seal against escape of water or the ingress of silt or the like through or around the seal, thus maintaining a water-impervious joint continuously under all conditions of service.

Further objects and advantages of the present invention will become apparent as the description proceeds and the features of the novelty will be pointed out in particularity in the appended claims; and the invention accordingly comprises the features of construction and arrangement of parts, which will be exemplified in the construction hereinafter set forth, and the scope of the application of which will be indicated in the claims.

The invention will be understood more readily by reference to the accompanying drawing, in which:

Fig. 1 is a sectional elevation of a pipe joint showing a connection between a bell and spigot type of pipe sections, illustrating the improved form of packing for the joint in conjunction with the improved internal shape of the pipe sections for acting upon the improved packing to produce a water-impervious seal under all conditions of service of the pipe.

Referring more particularly to the drawing, the improved joint is illustrated as made with bell and spigot pipe sections 2 and 4, which are illustrated as being composed of cast iron, although they may be of other material such, for example, as clay formed according to any of the usual ceramic processes, as will be obvious; and it will be understood that other forms of pipe sections than the bell and spigot type may be used, if desired. The hub or bell section 2 forms a retainer for resilient packing, as will be described hereinafter.

In the annular space between the pipe sections is interposed an annular rubber packing which is composed of two cooperating rings or gaskets 6 and 8, which have the shape illustrated in the drawing, and which occupy the annular space between the pipe sections in the manner shown.

It will be seen that this space has a particular configuration which is designed to retain the packing gaskets 6 and 8 in proper cooperating sealing engagement. This space comprises a restricted space 10 between the end 12 of the spigot pipe section 4 and the inner end of the retainer 2, the section 4 being inserted in the retainer 2 for a suitable distance, for example, as far as the threads 14 in the retainer hub 2, so as to form the space 10. This annular space 10 communicates with an annular space 16 which enlarges towards the outer end of the flaring bell of the retainer 2, the widest portion of the space 16 opening into the annular packing-containing space 18, the juncture between the spaces 16 and 18 defining an outwardly extending annular shoulder 20. The space 18 is of substantially uniform width until near the end of the retainer 2 when it flares outwardly as indicated at 22 and defines an inwardly-extending annular flange or rim 24 with the end 26 of the retainer 2, the opening 28 of the end 26 of the said retainer being of sufficient diameter to admit the spigot section 4 with the packing gasket 8 carried thereon.

It has been pointed out that the resilient packing is composed of two complementary parts, or gaskets, designated, respectively, 6 and 8, as have been identified above.

The gasket 6 is inserted first into the retainer 2, and rests loosely therein on the shoulder 20. The gasket 6 is provided with two annular legs 30, 32 which outwardly diverge to leave an open space 34 therebetween defining an annular groove which is in registry with the annular space 16 and which is, therefore, in communication therewith. The outer leg 32 abuts against the shoulder 20, and the inner wall of the retainer 2.

The fact that as shown the space 18 is of substantially uniform width throughout its major extent enables the use of a gasket as 6 having the two annular legs shown which will remain in position under the influence of internal pressure without a tendency to leakage either below the inner leg or around the outer leg as might otherwise be the case.

Also, the gasket 6 is provided interiorly with an annular taper 36 which extends from the outer edge of the top of the gasket towards the inside and the bottom of the gasket.

The gasket 8 is tapered as indicated at 38, this taper being exactly opposite to the taper 36 and is adapted to fit therebeneath. The edge of the gasket 8 at the taper 38 is rounded, as indicated at 40, to facilitate entry of the gasket 8 beneath the taper 36 of the gasket 6.

The gasket 8 is provided with an angularly disposed annular rim or enlargement 42, which slopes outwardly from the body of gasket 8 and when assembled with the remaining elements of the connection for service, it assumes the position shown in Fig. 1 in engagement with the retainer 2 and end rim 24. In order to facilitate manipulation of the enlargement 42, it is provided with a suitable number of longitudinal spaced slots, not shown, dividing the enlargement 42 into a plurality of lugs, and also a circumferential slot 44 at the juncture of the rim 42 and the body of the gasket 8.

In assembling the parts of the improved construction, the resilient packing gasket 6 is folded upon itself sufficiently to permit insertion thereof through the opening 28 into the interior of the retainer 2, the packing gasket 6 being inserted with the diverging legs 30 and 32 disposed towards the shoulder 20, the insertion being continued until the leg 32 abuts against the shoulder 20, the resiliency of the material of which the gasket is composed expanding the gasket upon release thereof and maintaining the gasket expanded in position against the inner wall of the retainer section.

The placing of gasket 8 in position is accomplished by passing the pipe section 4 through the packing gasket 8, the inside diameter of the latter being preferably somewhat slightly smaller than the outside diameter of the pipe section 4 so that the packing gasket will fit snugly onto the pipe section by stretching the gasket; and in order to facilitate insertion of the pipe section into the packing and the joint, the outer surface of the end 12 of the pipe section is tapered inwardly somewhat, as will be seen from the drawing. This taper prevents damage to the gaskets upon passage of the pipe therethrough, facilitates the assembly of the joint and also, upon angular movement of the two pipe sections with reference one to the other, whether this is caused by permanent or casual change of axial relation, tends to prevent frictional contact between the two pipe members which might result in damage to the pipes themselves, or so disarrange conditions as to prevent or limit the cumulative sealing action upon the joint, due to internal pressure within the pipe, which is an object of the invention. When the pipe section 4 has been passed through the gasket 8 sufficiently far, it is inserted in the retainer 2 so that the enlargement 42 passes through the opening 28 and, clearing the rim 24, expands immediately after such passage, because of its resiliency into its position shown in the drawing below the rim 24 in engagement therewith and with the inner wall of the retainer 2, while the taper 38 of the packing gasket 8 enters the space beneath the taper 36 of the packing gasket 6, the slots provided in the enlargement 42 enabling ready contraction and expansion of the enlargement. In order to facilitate this entrance and to guide the packing gasket 8 under the gasket 6, the end of the former is rounded, as is indicated at 40. As the pipe section 4 is inserted past the packing gasket 6, the leg 30 is compressed somewhat, and the space 34 is brought into registry with the space 16, so that fluid may enter the space 34 by way of spaces 10 and 16, thereby exerting pressure from behind against the packing gasket 6, and in the compressing action on the lip 30 the space 16 gives clearance for the lip upon insertion of the pipe 4 preventing pinching of said lip between the pipe members in the rearmost position of the gasket before being advanced by the fluid pressure.

Now, the taper 38 of the packing gasket 8 forms an annular wedge-shaped space between itself and the inner wall of the retainer 2, the packing gasket 6 fitting into this wedge-shaped space, so that when fluid pressure occurs, the packing gasket 6 is compressed thereby into the wedge-shaped space, thereby forcing the packing into a fluid-tight seal, which maintains a continuously unbroken seal between the packing gaskets 6 and 8 and the pipe sections 2 and 4, the resiliency of the packing at the same time allowing some degree of flexing between the pipe sections, as indicated by the broken lines 48 and 50 on the drawing; and also the seal is maintained against "line pull" on the pipe sections, the gasket 8 of the packing being retained firmly in its position by the rim 24.

It will be seen, therefore, that the positioning of the packing gasket 8 in the retainer 2 is accomplished by passing the pipe section 4 through the gasket 8, allowing gasket 8 to enter the retainer 2 with the inserted pipe section 4 until the lugs on the enlargement 42 of the gasket 8 have passed through the opening 28 sufficiently to clear the rim 24 on the inside of the retainer 2, and which in turn forms the recess at the top of the retainer 2 for holding gasket 8 in position. With packing gasket 8 in position, the tapered portion 38, which is exactly the opposite of the taper 36 of packing gasket 6, has come into engagement with the taper 36, and the packing gasket 8 being held from the outside by the recess at the top of the retainer 2, and the packing gasket 6 being held from the inside by the recess defined by the shoulder 20 at the bottom of the retainer 2, the packing seal is completed with the inserted pipe section 4 extended through the lower end of the packing gasket 6.

The seal produced by the packing gaskets is completed when packing gasket 6 has been forced through resistance to water pressure created in the line, away from the water pressure and toward gasket 8, the operation comprising the gradual wedging of gasket 6 onto gasket 8, the latter being held by the rim 24. The greater the resistance to pressure, the more solidly the lugs on gasket 8 become engaged with the retainer 2, and in turn the greater becomes the friction between the tapered portions 36 and 38 of the packing gaskets 6 and 8.

In order to facilitate the movement of gasket 6 onto its complementary gasket 8, the inner wall of the retainer 2 may be provided with a lubricant, as well as the outer surface of the inserted pipe section 4 and the contacting tapered surfaces of the packing gasket. The purpose of such lubrication is to permit packing gasket 6 to move freely onto the packing gasket 8, this movement positively wedging the inside of gasket 8 against the outer surface of the inserted pipe section 4 while at the same time positively wedging the outer surface of packing gasket 6 against the inner surface of the retainer 2.

The completion of the wedge of the inside of gasket 8 and the outside of gasket 6 provides a fulcrum whereby an angular shifting of position of the pipe sections 2 and 4 is permitted without impairment to the seal produced by the packing gaskets.

It may be noted in this connection that the legs 30 and 32 at the bottom of gasket 6 are designed to resist the water pressure generated within the pipe line, and because of that design, the more pressure that is formed the greater is that resistance until gasket 8 of the packing has been forced onto gasket 6 as far as is permitted by the confinement or compression of the packing and the space allotted for such confinement.

It will be seen from the foregoing description, therefore, that the present invention comprises a flexible pipe-line joint including a pair of complementary resilient packing gaskets maintained in position between pipe sections by gasket retaining recesses in one of the sections, the gaskets being forced into relative wedged sealing relation by liquid pressure in the pipe line, and maintained in that sealing relation by the liquid pressure in the line, while permitting angular change between the pipe sections of the joint.

From the foregoing description, it will be understood, of course, that the invention is not limited necessarily, to the specific details of construction as are specificaly illustrated and described herein, but it will be apparent that such details are subject to various modifications which will become apparent readily to one skilled in the art, without departing from the spirit of the invention; and it will be understood, therefore, that it is intended and desired to include within the scope of the invention such modifications and changes as may be necessary to adapt it to varying conditions and uses. It is also to be understood that the following claims are intended to cover all of the generic and specific features of the invention herein described, and all statements of the scope of the invention, which as a matter of language, might be said to fall therebetween.

Having described my invention, what I claim as new and desire to secure by Letters Patent is:

1. A fluid-seal pipe joint assembly, comprising, in combination, an inner pipe member, an outer pipe member, the pipe members defining an annular space between them communicating with pressure of fluid flowing through the pipe members, an annular retaining rim at each end of the annular space, cooperating resilient wedge-acting packing means within the annular space abutting against the retaining rims and held in position thereby and also engaging the pipe members, and means for leading fluid from the pipe members into pressure engagement with the packing means for forcing the said means into complete sealing position, said last-named means comprising a recess radially inward of the innermost retaining rim of the outer pipe member for receiving an adjacent portion of the packing means to prevent pinching the latter upon insertion of the inner pipe member and clearance for angular disposition of the pipe members with respect to each other.

2. A fluid-seal pipe joint assembly comprising, in combination, an inner pipe member, an outer pipe member, the pipe members defining an annular space between them communicating with pressure of fluid flowing through the pipe members, the outer member being provided with shoulders at each end of the annular space, a plurality of resilient packing means within said space bearing against and limited in position by said shoulders, the parts thereof being so proportioned and arranged that under action of fluid pressure within the pipe line, said resilient packing means are driven more firmly into position, and said outer pipe member being provided with a recess radially inward of the innermost of said shoulders to receive an adjacent portion of said packing means to prevent pinching the latter upon insertion of the inner pipe member and to provide clearance for angular disposition of the pipe members with respect to each other.

3. A flexible spigot and bell joint comprising, in combination, a spigot member and a bell member defining between them an annular recess communicating with the interior of the said members, a plurality of cooperating resilient gasket members positioned in said recess, the innermost of said gasket members including an annular recess communicating with the interior of said joint and being movable in response to pressure from fluid therein, and means integral with said bell member for retaining the outermost of said gasket members in relatively fixed position, said means comprising a shoulder and radialy inwardly thereof an annular recess providing a clearance space for an adjacent portion of the innermost gasket member.

WILLIAM B. NEAL.